Figure 1:
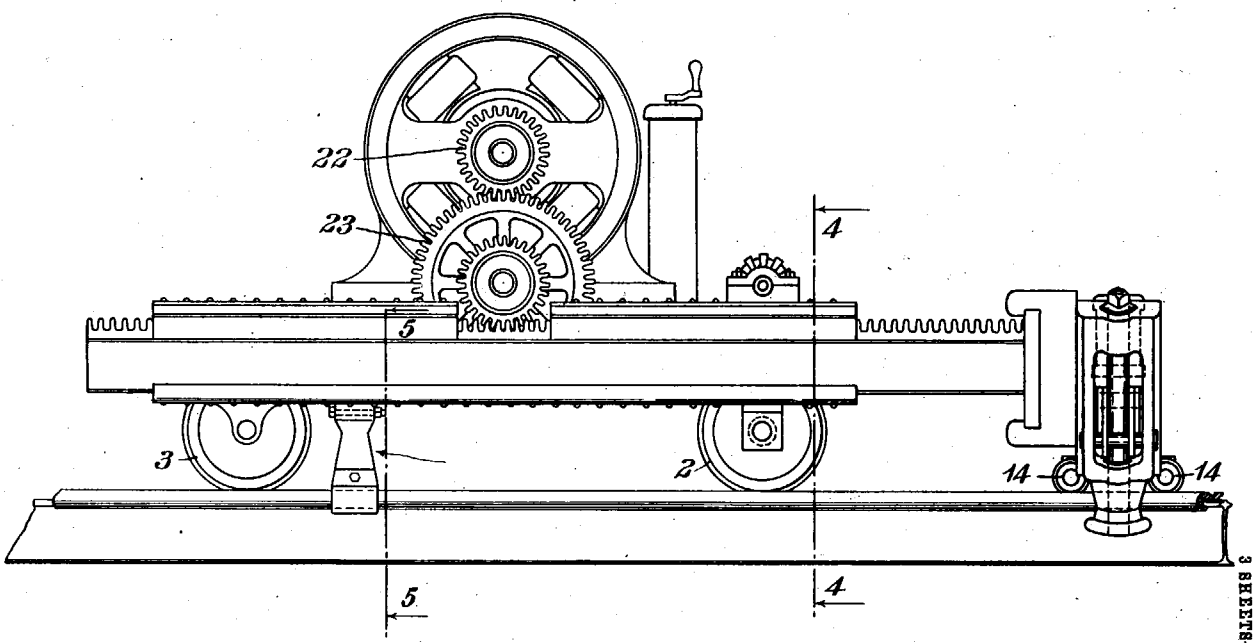

J. NOLL.

APPARATUS FOR WORKING ON THE UPPER OR WEARING PORTIONS OF COMPOUND TRAM RAILS.

APPLICATION FILED JUNE 15, 1912.

Reissued Aug. 20, 1912. 13,459.

3 SHEETS—SHEET 1.

Witnesses:
Edwin A. Packard
Marjorie Rollins

Inventor
John Noll
By his Attorneys
Kidder Wendell & Margeson

COLUMBIA PLANOGRAPH CO., WASHINGTON, D. C.

J. NOLL.

APPARATUS FOR WORKING ON THE UPPER OR WEARING PORTIONS OF COMPOUND TRAM RAILS.

APPLICATION FILED JUNE 15, 1912.

Reissued Aug. 20, 1912. 13,459.

3 SHEETS—SHEET 2.

Witnesses:
Edwin A. Packard
Marjorie Rollins

Inventor
John Noll
By his Attorneys
Kiddle Pendleton & Morgan

COLUMBIA PLANOGRAPH CO., WASHINGTON, D. C.

J. NOLL.

APPARATUS FOR WORKING ON THE UPPER OR WEARING PORTIONS OF COMPOUND TRAM RAILS.

APPLICATION FILED JUNE 15, 1912.

Reissued Aug. 20, 1912. 13,459.

3 SHEETS—SHEET 3.

Witnesses:
Edwin A. Pickard
Marjorie Rollins

Inventor
John Noll,
By his Attorney
Kidder, Kendall & Thompson

COLUMBIA PLANOGRAPH CO., WASHINGTON, D. C.

UNITED STATES PATENT OFFICE.

JOHN NOLL, OF NEW YORK, N. Y., ASSIGNOR TO CONTINUOUS RAIL COMPANY, OF WILMINGTON, DELAWARE, A CORPORATION OF DELAWARE.

APPARATUS FOR WORKING ON THE UPPER OR WEARING PORTIONS OF COMPOUND TRAM-RAILS.

13,459. Specification of Reissued Letters Patent. Reissued Aug. 20, 1912.

Original No. 1,024,906, dated April 30, 1912, Serial No. 660,551. Application for reissue filed June 15, 1912. Serial No. 703,981.

*To all whom it may concern:*

Be it known that I, JOHN NOLL, a citizen of the United States, and a resident of the borough of Brooklyn of the city of New York, in the county of Kings and State of New York, have invented certain new and useful Improvements in Apparatus for Working on the Upper or Wearing Portions of Compound Tram-Rails, of which the following is a specification.

The invention relates to apparatus for working upon the side portions of a compound tram-rail whereby the wearing portion thereof may be readily secured in place or also whereby a wearing portion may be readily removed therefrom by respectively compression rollers or shears which operate upon the side portions of the rail.

The invention particularly relates to a construction in which compression rollers are moved longitudinally along the wearing portion of the compound rail by means cooperating with supporting means or frame for the compression rollers and a means which may be fixedly secured relatively to the rail.

The invention furthermore relates to a construction comprising a frame supported on wheels at its ends and which frame carries reciprocating rods connected by a transverse member at their forward ends and provided thereat with compression rollers to engage the sides of the rail and anti-friction pressure transmitting rollers to engage the top of the rail. It is also directed to such a construction in which the wheels at the forward end of the carriage can be lifted from the tracks and in which the frame is provided with a motor for reciprocating the rods carrying the compression rollers and a clamping means for securing the frame in place upon the rail.

As showing a specific embodiment of the invention, reference is made to the drawings forming a part of the specification in which—

Figure 2:
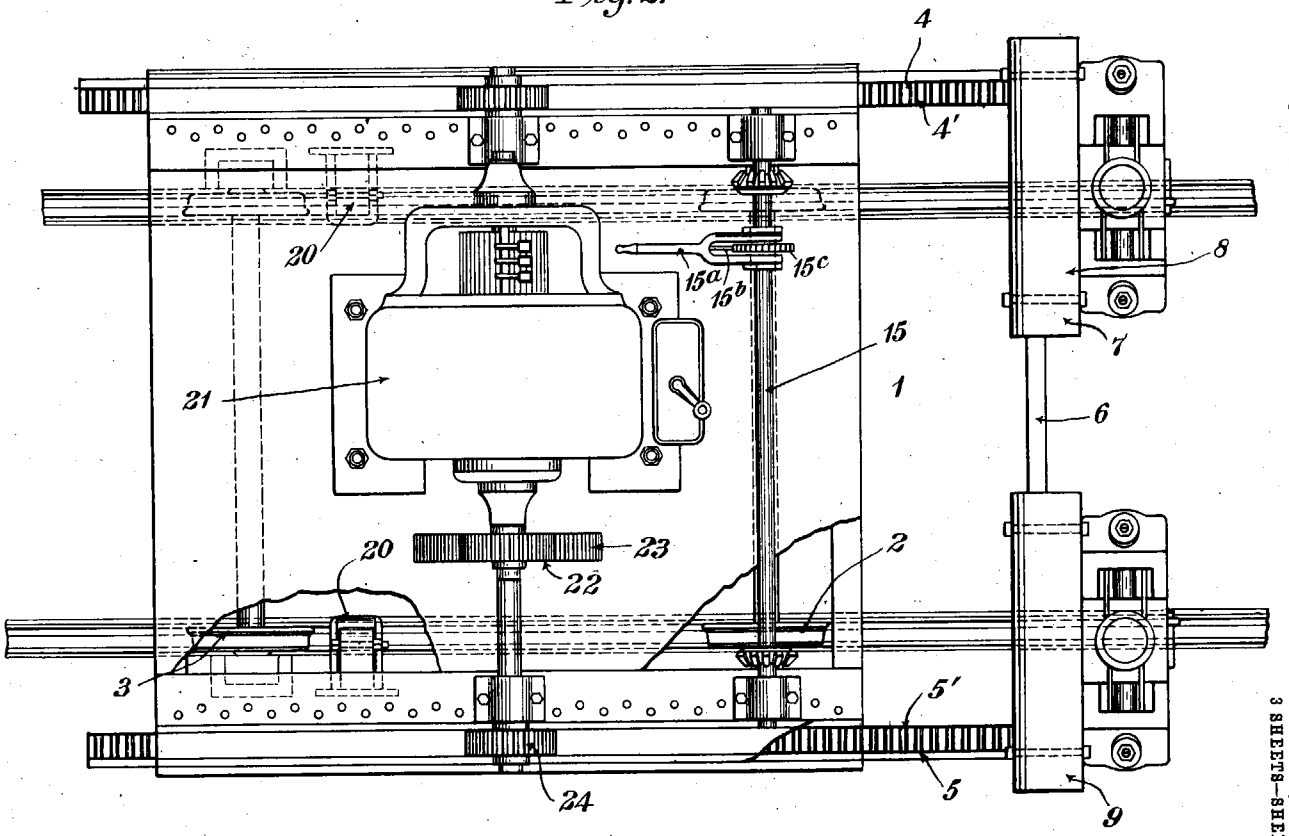
Figure 3:
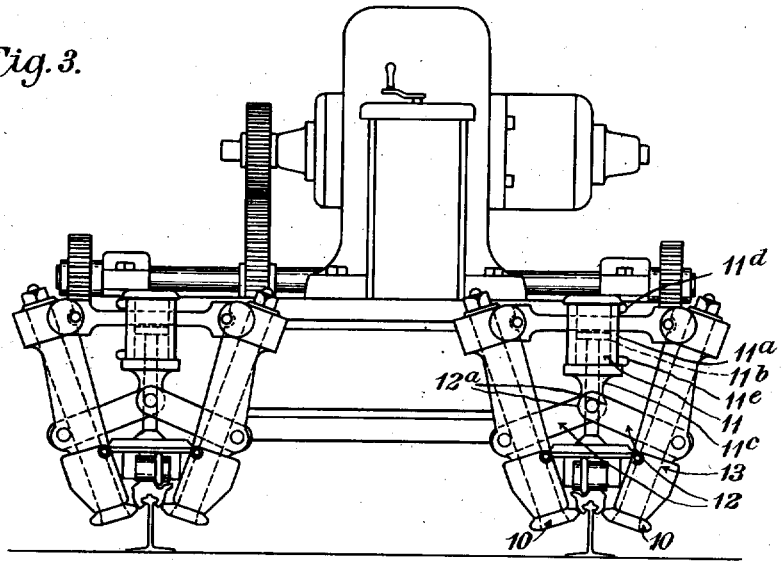
Figure 4:
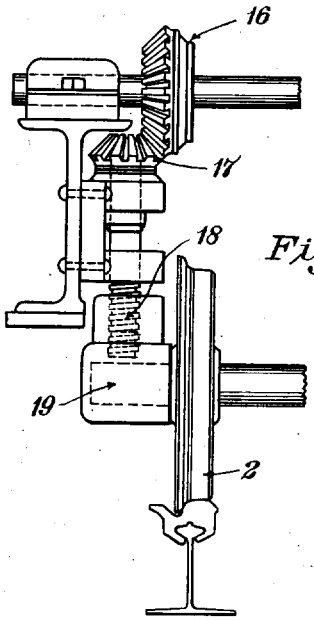

Figure 1 is a side elevation of the apparatus. Fig. 2 is a plan view partially broken away of the apparatus. Fig. 3 is an end elevation looking toward the forward end of the apparatus. Fig. 4 is a detail view taken on the line 4—4 of Fig. 1 looking in the direction of the arrows showing the mechanism for lifting the forward wheels from the track, and Fig. 5 is a detail view taken on the line 5—5 of Fig. 1 of the mechanism for clamping the main frame to the rail.

The main frame is designated by the reference character 1 and is provided respectively at its forward and rear ends with wheel supporting means 2 and 3. There is slidably mounted in the frame a pair of longitudinally movable reciprocating rods 4 and 5 each provided with racks 4′ and 5′ respectively. These rods are connected at their forward ends by the transverse member 6 to which there are secured as by the bolts 7 transversely adjustable housings or roll carrying frames 8 and 9. Each of the housings 8 and 9 supports a pair of coöperating rotary tools or rolls 10—10 which engage the downwardly extending lips on the opposite sides of the wearing portion of a tram-rail in order to bend said lips into holding engagement with the base portion of the rail. These rolls are adjustable to and from each other and forced toward each other by means of the fluid operated mechanism 11 and the link connections 12 extending between it and the adjustable roll carrying portions 13. The fluid operating mechanism 11 comprises a cylinder $11^a$, having therein a piston $11^b$ which is connected by means of the rod $11^c$ to the vertically movable connected ends $12^a$ of the links 12. It is of course apparent that the operating fluid may be supplied to opposite ends of each of the cylinders $11^a$, so as to either raise or lower the piston $11^b$ through any suitable valve controlled conduits or pipes indicated at $11^d$ and $11^e$. The housings 8 and 9 are also provided with the anti-friction rollers 14—14 which serve as means for transmitting to the wearing portion of the rail during the bending operation the downward thrust due to the weight of the forward portion of the carriage, the load thereupon and the weight of the forward portion of the reciprocating rods, the transverse member carried thereby and the housings thereupon all of which are carried by the anti-friction rollers 14—14 when the forward wheels 2 are lifted from the track.

In Figs. 1, 2 and 4 there is shown means for raising the forward trucks from the tracks whereby all of the weight of the apparatus and the load thereupon will be carried to and transmitted by the anti-friction rollers 14—14 and the rear wheels 3 directly to the track. This means comprises a shaft 15 which operates through the bevel gears 16 and 17 and the screw 18 which enters a nut portion in the bearing 19 to effect the raising of said wheel from its position on the track. The shaft 15 is operated by the hand lever $15^a$ which is provided with a pawl $15^b$ that engages the ratchet wheel $15^c$ on the shaft 15. It is obvious, however, that this shaft may be operated by power instead of by hand if desired.

Figure 5:
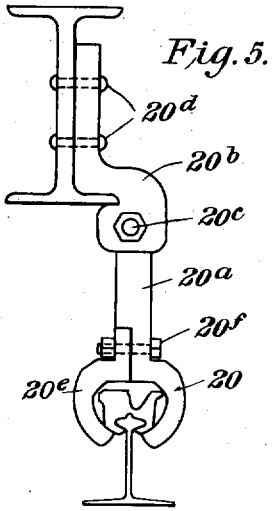

The main frame 1 of the apparatus may be fixedly secured relative to the track by the clamping means 20 shown in detail in Fig. 5. This clamping means comprises a jaw member $20^a$ which is secured to the bracket $20^b$ by the bolt $20^c$ and the bracket is riveted at $20^d$ to an I-beam in the main frame 1. A second jaw member $20^e$ is cooperatively related to the jaw member $20^a$ so that when they are drawn together by the bolt $20^f$ they can clamp therebetween the head portion of a rail upon which the apparatus is supported.

The rods 4 and 5 are operated by a reversing motor 21 through the gears 22—23 and 24 and racks 4′ and 5′. When it is desired to operate the apparatus at any particular point on the track, the apparatus is first brought to the proper position for carrying out the operation. Then that portion of the main frame carrying the motor 21 is secured to the track by the clamping mechanism 20 and the shaft 15 is turned so as to lift the supporting wheels 2 from the track so that all of the weight of the apparatus rests at one end on the supporting wheels 3 and at the other end upon the anti-friction rollers 14. Now, when the pressure is supplied to the lower ends of each of the cylinders $11^a$, the operating rollers or tools 10 will be forced toward each other against the outer side portions of the head or top section of the rail. When these operating tools 10 are thus forced toward each other in engagement with the rail the motor 21 is operated so as to reciprocate by means of the rack and pinion mechanism the tools longitudinally along the rail and thus perform the work thereupon. When the operation is completed the fluid is supplied to the upper end of each of the cylinders $11^a$ so as to cause the tools 10 to move away from the section engaged thereby, the supporting wheels 2 are lowered, the clamping mechanism is released, and the apparatus is then ready to be moved to the proper position to perform another cycle of operations. It will be apparent that this motor may be geared to the supporting wheels whereby it may be utilized to move the apparatus along the track if desired and it is obvious that various forms and modifications may be made without departing from the spirit and scope of the invention.

I claim as my invention:

1. In an apparatus for working on compound rails, the combination of a main frame, means for supporting the frame on the rails, a member mounted on the frame so as to reciprocate relative to the frame in the direction in which the rail to be worked upon extends and opposed rotary means on the reciprocating member to engage opposite portions of the rail.

2. In a device of the class described, the combination of a main frame, means for clamping the frame to a rail, a longitudinally movable member having connected thereto and movable therewith and thereby, opposed rotary tools adapted to engage opposite side portions of the rail and means on the frame for moving the member longitudinally.

3. In a device of the class described, the combination of means which may be fixedly secured relative to a rail, means movable longitudinally along the rail having opposed rotary tools thereupon to engage opposite portions of the rail and means between the means fixedly secured relative to the rail and the tools whereby the latter will be moved longitudinally along the rail, the rotary movement of the tools being caused by the movement of the carriage along the rail.

4. The combination of a main frame having supporting wheels at the rear portion thereof and supporting wheels at the forward portion thereof, a reciprocating rod slidably mounted on the frame, said rod carrying at the forward end thereof cooperating compression rollers to engage the side portions of a rail and anti-friction rollers to engage the top surface portion of a rail, means for reciprocating the rod relative to the frame and means for causing the wheels at the forward end of the frame to be raised relative to the wheels at the rear portion of the frame and the anti-friction rollers at the forward portion of the rod whereby the entire weight of the apparatus and the load thereupon will be carried by the rear wheels and the anti-friction rollers.

5. The combination of a main frame having supporting wheels at the rear portion thereof and supporting wheels at the forward portion thereof, a reciprocating rod slidably mounted on the frame, said rod carrying at the forward end thereof coöperating compression rollers to engage the side portions of a rail and anti-friction rollers to engage the top surface portion of a rail, means for reciprocating the rod relative to the frame, means for causing the wheels at the forward end of the frame to be raised relative to the wheels at the rear portion of the frame and the anti-friction rollers at the forward portion of the rod whereby the entire weight of the apparatus and the load thereupon will be supported by the rear of the frame and the anti-friction rollers, and a clamp on the frame adapted to secure the frame to the rail.

6. In a device of the class described, the combination of a main frame, forward and rear wheel supports therefor arranged to engage and rest upon both rails of a track, a pair of reciprocating members movable longitudinally in the direction in which the rails extend, a transverse member secured to and extending between the forward ends of said reciprocating rods, said transverse member carrying two sets of adjustable means each of which supports a pair of compression rollers that are adapted to engage and bend the lip portions of the wearing portions of compound rails in place, each of said supporting means also being provided with a roll or rollers adapted to transmit downward pressure to the wearing portion of the rail as it is being secured in place by the compression rollers, a motor on the frame having gear operating connections for simultaneously reciprocating the rods, means for clamping the main frame to the rails and means effecting relative movement between the anti-friction rollers and the forward supporting wheels whereby all of the weight of the apparatus and load thereupon will be transmitted to the underlying rails through the rear portion of the frame and the anti-friction rollers adjacent to the compression rollers thereby forcing the wearing portion of the compound tram-rail downward upon its support during the time that the compression rollers are performing their work.

7. The combination of an apparatus comprising a frame carrying reciprocating means movable relative thereto and provided with compression means to engage and bend upper portions of compound rails, said reciprocating means also provided with means movable therewith and relative to the frame in the direction in which the means reciprocate to engage the upper surfaces of the upper wearing portions of said rails and press it downward to seat on the bottom portion of said rail and means whereby pressure of the said apparatus and load will transmit downward pressure to the rail only through the rear portion of the carriage and the pressing means located at the forward end of the reciprocating means.

8. An apparatus of the class described comprising a frame carrying a reciprocating means movable relative to a portion thereof, which reciprocating means is provided with means to engage and bend lip portions of a compound rail, said reciprocating means also provided with means movable therewith and relative to the portion of the frame above referred to in the direction in which the means reciprocates to engage the upper surface of the wearing section of said rail and press it downward to seat it on the bottom section, and means whereby the apparatus and its load will transmit downward pressure to the rail only through the rear portion of the apparatus and the pressing means which is located at the forward end of the reciprocating means.

9. In an apparatus of the class described, the combination of means to be held stationary relative to the rail, movable means comprising rotary members to engage opposite side portions of the rail and means between the stationary means and the movable means for moving the last mentioned means longitudinally along the rail, the members mounted so as to be rotated by the movement of the second mentioned means along the rail and at least one of said rotary members being an operating tool.

This specification signed and witnessed this 14th day of June, A. D., 1912.

JOHN NOLL.

In the presence of—
EUGENE DELMAR,
EDWIN O. PACKARD.

Copies of this patent may be obtained for five cents each, by addressing the "Commissioner of Patents. Washington, D. C."